(12) United States Patent
Hoshino

(10) Patent No.: US 11,305,877 B2
(45) Date of Patent: Apr. 19, 2022

(54) ELECTRONIC DEVICE AND INFORMATION PROCESSING APPARATUS

(71) Applicant: Panasonic Intellectual Property Management Co., Ltd., Osaka (JP)

(72) Inventor: Sho Hoshino, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 767 days.

(21) Appl. No.: 16/137,007

(22) Filed: Sep. 20, 2018

(65) Prior Publication Data

US 2020/0094967 A1 Mar. 26, 2020

(51) Int. Cl.
*B64D 11/06* (2006.01)
*G01P 1/02* (2006.01)
*B64D 11/00* (2006.01)

(52) U.S. Cl.
CPC ...... *B64D 11/064* (2014.12); *B64D 11/00151* (2014.12); *G01P 1/023* (2013.01)

(58) Field of Classification Search
CPC .. B64D 11/064; B64D 11/00151; G01P 1/023
See application file for complete search history.

(56) References Cited

U.S. PATENT DOCUMENTS

| 4,896,209 A | 1/1990 | Matsuzaki et al. |
| 2015/0312546 A1* | 10/2015 | Hasegawa ................. 348/59 |
| 2019/0259171 A1* | 8/2019 | Ueno ................... B64D 11/064 |

FOREIGN PATENT DOCUMENTS

| JP | 63-215287 | 9/1988 |
| JP | 10-178387 | 6/1998 |
| JP | 2015-093648 | 5/2015 |

* cited by examiner

*Primary Examiner* — Anthony D Barfield
(74) *Attorney, Agent, or Firm* — Wenderoth, Lind & Ponack, L.L.P.

(57) ABSTRACT

An electronic device in an aspect of the present disclosure is an electronic device which is mounted on a seat that is turnable around a first axis such that the electronic device is turnable around a second axis. The electronic device includes a detector that detects acceleration information, and a controller that determines which of a turn around the first axis and a turn around the second axis is occurring based on a temporal change in the acceleration information detected by the detector.

7 Claims, 7 Drawing Sheets

ELECTRONIC DEVICE AND INFORMATION PROCESSING APPARATUS

BACKGROUND

1. Technical Field

The present disclosure relates to an acceleration measurement device used in a monitor mounted on a passenger seat in an airplane.

2. Description of the Related Art

In recent years, each of passenger seats of airplanes has an electronic device with a monitor installed integrally with the seat, like the passenger seat disclosed in Patent Literature 1 (Unexamined Japanese Patent Publication No. S63-215287. Each passenger can operate the electronic device mounted on the seat in front of the passenger to spend time in a comfortable space enjoying the contents such as games and videos.

SUMMARY

In airplanes, however, the passenger seats must be returned to the upright positions before, for example, takeoff or landing, from the view point of ensuring safety of the passengers. On the other hand, in the above-mentioned conventional passenger seats, not only the seat can be reclined, but also the angle of the electronic device relative to the seat can be changed. Accordingly, it is difficult to identify whether the seat is reclined or whether the electronic device is turned.

An electronic device in an aspect of the present disclosure is an electronic device which is mounted on a seat that is turnable around a first axis such that the electronic device is turnable around a second axis. The electronic device includes a detector that detects acceleration information, and a controller that determines which of a turn around the first axis and a turn around the second axis is occurring based on a temporal change in the acceleration information detected by the detector.

An electronic device in another aspect of the present disclosure is an electronic device which is mounted on a reclining seat such that the electronic device is inclinable. The electronic device includes a detector that detects acceleration information, and a controller that determines which of an inclination of the seat and an inclination of the electronic device is occurring based on a temporal change in the acceleration information detected by the detector.

An information processing apparatus in still another aspect of the present disclosure is an information processing apparatus which is connected to a plurality of electronic devices that are respectively mounted on a plurality of seats arranged in a vehicle, where each of the plurality of seats is turnable around a first axis, and each of the plurality of electronic devices is turnable around a second axis relative to a respective one of the plurality of seats. The information processing apparatus includes an input unit, a first determination unit, a second determination unit, a calculator, and an output unit. The input unit receives acceleration information detected by each of the plurality of electronic devices. The first determination unit determines, based on a temporal change in acceleration information received from a first electronic device among the plurality of electronic devices, a turned state of a seat on which the first electronic device is mounted around the first axis and a turned state of the first electronic device around the second axis. The second determination unit determines an inclination state of the vehicle based on an amount of change of acceleration information detected by the plurality of electronic devices. The calculator calculates an inclination angle of the seat on which the first electronic device is mounted based on the turned states determined by the first determination unit and the inclination state of the vehicle determined by the second determination unit. The output unit outputs inclination information including the inclination angle calculated by the calculator.

According to the present disclosure, it is possible to identify whether a seat is in a reclined position or a monitor is in a turned position.

DETAILED DESCRIPTION OF PREFERRED EMBODIMENT

Hereinafter, an exemplary embodiment will be described with reference to the accompanying drawings as appropriate. However, unnecessarily detailed description will occasionally be omitted. For example, detailed description of well-known matters and redundant description of substantially the same configuration will occasionally be omitted. They will be omitted to avoid the following description from becoming unnecessarily redundant, and to allow any person skilled in the art to easily understand the disclosed embodiments.

Also, it should be noted that the following description and the accompanying drawings are provided to allow any person skilled in the art to fully understand the present disclosure, and that it is not intended to limit the subject matter described in the claims by the following description.

Also, in the present specification and drawings, an X-axis, a Y-axis and a Z-axis denote three axes in a 3-dimensional orthogonal coordinate system. The X-axis and the Y-axis are orthogonal to each other and are orthogonal to the Z-axis.

Exemplary Embodiment

Hereinafter, the present exemplary embodiment will be described with reference to FIGS. 1 to 3.

1-1. Configuration

Figure 1:
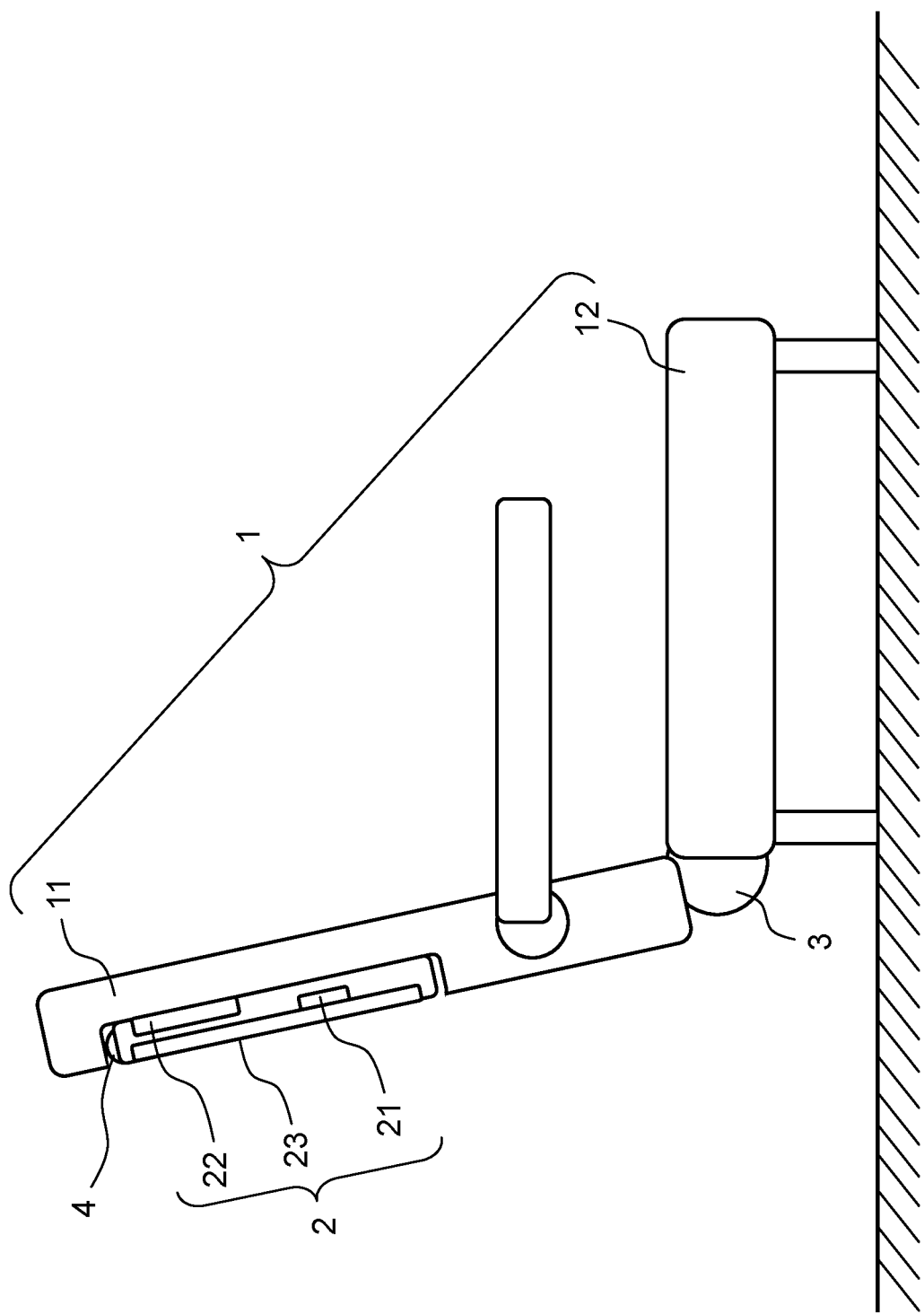
FIG. 1 is a schematic view illustrating an example of a seat on which an electronic device is mounted in accordance of an exemplary embodiment.

FIG. 1 is a schematic view illustrating an example of a seat on which an electronic device is mounted in accordance of the present exemplary embodiment.

Electronic device 2 in accordance with the present exemplary embodiment is mounted on seatback 11 of seat 1 which has seatback 11 and seat base 12. Specifically, electronic device 2 is mounted on a backside of seat 1 opposite to a side against which a passenger seating on seat 1 rests his/her back. In a vehicle such as an airplane or the like, seats 1 are arranged from front to back and from left to right. Accordingly, an electronic device for each passenger is mounted on a backside of a seatback of a seat in front of the passenger, and the passenger can use the electronic device disposed in front of the passenger to play games or watch videos such as movies or the like.

The seat is a reclining seat, which has first axis 3 between seat base 12 and seatback 11 so that the seatback can be turned around the first axis.

Also, electronic device 2 has second axis 4 between itself and seatback 11 such that electronic device 2 is turnable around the second axis. This allows the passenger to turn the electronic device to adjust the angle of the electronic device so that the passenger can comfortably view the monitor of the electronic device even if the seatback of the front seat is reclined.

Also, electronic device 2 further has acceleration sensor 21 as a detector, controller 22, and display unit 23.

The detector uses, for example, acceleration sensor 21 to detect three dimensional coordinates on the X-, Y- and Z-axes of a position at which the electronic device is located. This allows three dimensional coordinates on the X-, Y- and Z-axes of the position of the electronic device to be detected as the acceleration information, even if the electronic device is turned around second axis 4.

Description in the present exemplary embodiment will hereinafter be made assuming the detector as acceleration sensor 21.

Also, controller 22 uses, for example, a CPU (central processing unit) and a memory to determine whether the seat is in a reclined position (the seatback has been turned) or the monitor (the electronic device) has been turned, based on the acceleration information detected by acceleration sensor 21 in an operation which will be described later.

Also, display unit 23 can display a determination result of controller 22 (including the turned state of seatback 11 and the turned state of electronic device 2), as well as video contents of games, movies or the like.

Figure 2:
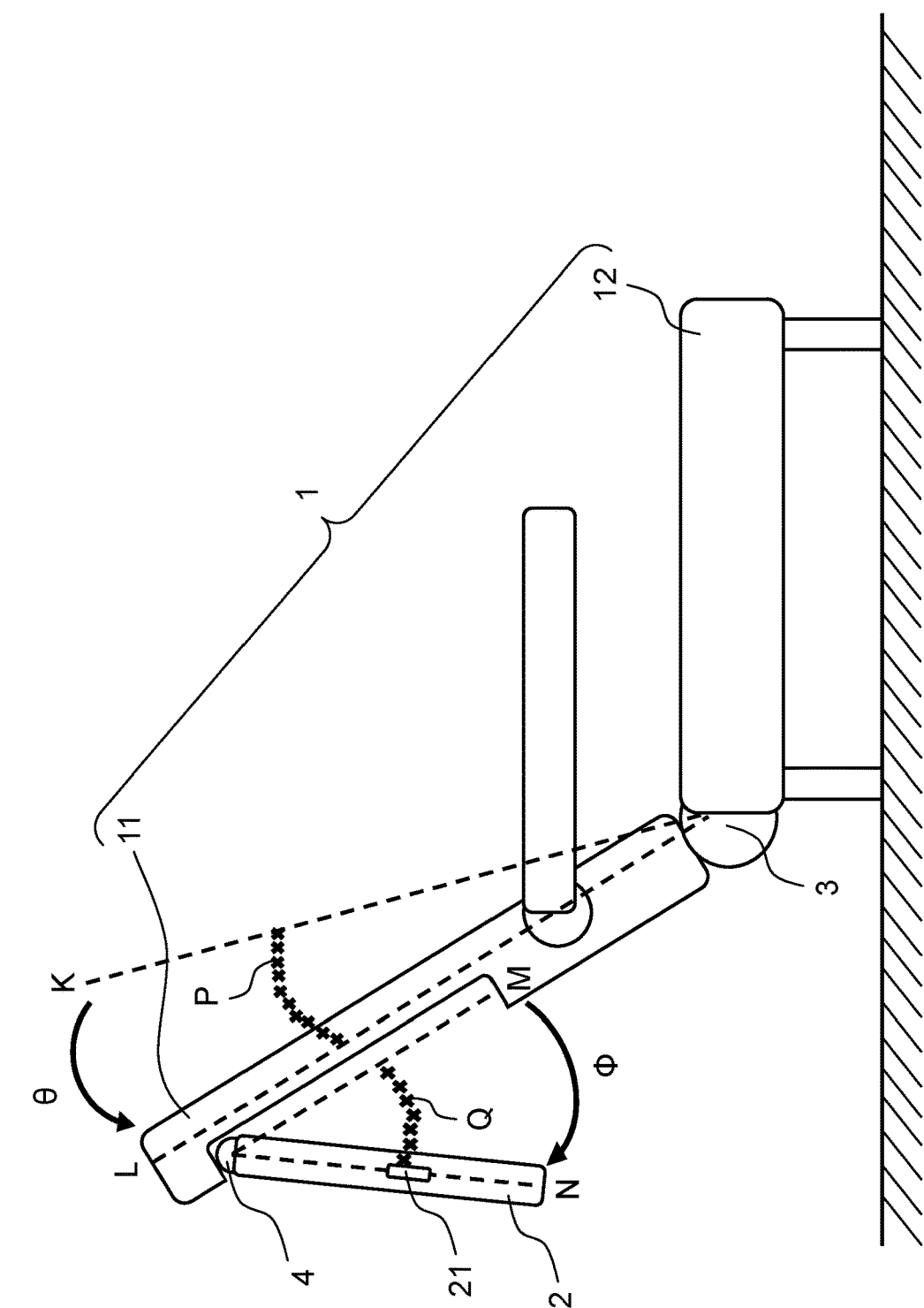
FIG. 2 is a view illustrating an example virtually expressing a turning trajectory of a seatback around a first axis and a turning trajectory of an electronic device around a second axis in the seat shown in FIG. 1.

FIG. 2 is a view illustrating an example virtually expressing a turning trajectory of seatback 11 around first axis 3 and a turning trajectory of electronic device 2 around second axis 4 in the seat shown in FIG. 1. In FIG. 2, controller 22 and display unit 23 are omitted for simplicity.

As shown in FIG. 2, a K-axis is a coordinate axis formed by connecting seatback 11 before being turned and first axis 3, and an L-axis is a coordinate axis formed by connecting seatback 11 after having been turned and first axis 3.

When seatback 11 has been turned by angle θ from the K-axis to the L-axis, electronic device 2 detects the position (the turned state) of seatback 11 as trajectory P of turning around first axis 3 using acceleration information obtained by acceleration sensor 21. Specifically, acceleration sensor 21 of electronic device 2 continuously catches temporal changes in the acceleration information as 3-dimensional values of X, Y and Z as shown in FIG. 2.

Here, what is meant by "to catch temporal changes" is to acquire the 3-dimensional values at intervals of as often as 1 millisecond (msec).

Also, as shown in FIG. 2, an M-axis is a coordinate axis formed by connecting electronic device 2 before being turned and second axis 4, and an N-axis is a coordinate axis formed by connecting electronic device 2 after having been turned and second axis 4.

When electronic device 2 has been turned by angle φ from the M-axis to the N-axis, electronic device 2 detects the position (the turned state) of electronic device 2 as trajectory Q of turning around second axis 4 using acceleration information obtained by acceleration sensor 21. Specifically, acceleration sensor 21 of electronic device 2 continuously catches temporal changes in the acceleration information as 3-dimensional values of X, Y and Z as shown in FIG. 2.

1-2. Operations

Figure 3:
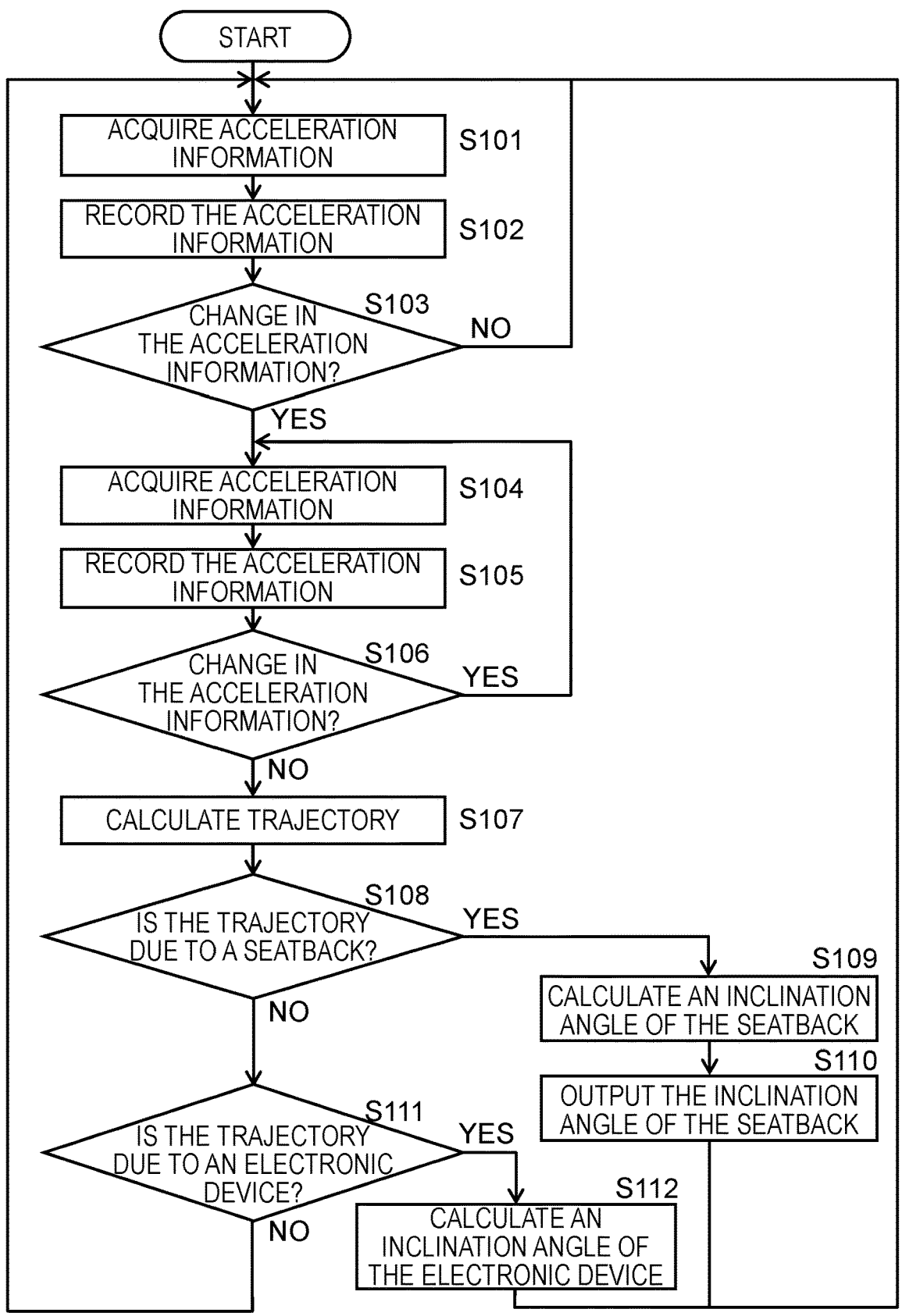
FIG. 3 is a flowchart for determining a turn in accordance with the present exemplary embodiment.

FIG. 3 is a flowchart for determining a turn in accordance with the present exemplary embodiment.

First, the electronic device acquires the acceleration information using the equipped acceleration sensor (S101). The electronic device may begin acquiring the acceleration information when the acceleration sensor has been activated or when the acceleration sensor has received a signal instructing to acquire the acceleration information.

Next, the electronic device records the acquired acceleration information (S102). As the recording means, a recording unit may be provided in the acceleration sensor or a recording device may be provided separately from the acceleration sensor.

Next, the controller determines whether or not there are any changes in the acceleration information (S103). If no changes in the acceleration information is detected (NO in S103), the process returns to step S101 to catch a change in the acceleration information if any.

On the other hand, if there is a change in the acceleration information (YES in S103), the electronic device acquires new acceleration information using the acceleration sensor (S104) and records the acquired acceleration information (S105) in the same manners as step S101 and step S102 to calculate a trajectory of the acceleration information.

Then, to know stop of the change in the acceleration information, the controller determines whether or not there are any changes in the acceleration information (S106) in the same manner as step S103.

If there is a change in the acceleration information (YES in S106), the process returns to step S104 to calculate the trajectory of the acceleration information.

On the other hand, if there are no changes in the acceleration information (NO in S106), or the acceleration information has stopped changing, the controller calculates a trajectory of the acceleration information based on the acceleration information recorded in step S105 (S107). Specifically, the controller calculates a turn around first axis 3 or a turn around second axis 4 as a trajectory (P or Q) based on the temporal changes in the value of the acceleration information, as shown in FIG. 2.

Next, the controller determines whether the calculated trajectory of the acceleration information is attributed to the seatback (S108). Specifically, if the calculated trajectory of the acceleration information becomes an upward-projected curve (trajectory P) as shown in FIG. 2, the controller determines that the temporal changes in the acceleration information have been caused by a turn of seatback 11 around first axis 3.

In a case where the trajectory of the acceleration information is attributed to the seatback (YES in S108), the controller calculates an inclination angle of the seatback based on the calculated trajectory of the acceleration information (S109), and outputs the inclination angle of the seatback to the display unit of the electronic device (S110).

On the other hand, in a case where the calculated trajectory of the acceleration information is not attributed to the seatback (NO in S108), the controller determines whether or not the calculated trajectory of the acceleration information is attributed to the electronic device (S111). Specifically, if the calculated trajectory of the acceleration information becomes a downward-projected curve (trajectory Q) as shown in FIG. 2, the controller determines that the temporal changes in the acceleration information have been caused by a turn of electronic device 2 around second axis 4.

In a case where the trajectory of the acceleration information is attributed to the electronic device (YES in S111), the controller calculates an inclination angle of the electronic device based on the calculated trajectory of the acceleration information (S112). The calculated inclination angle of the electronic device may be output to the display unit of the electronic device.

On the other hand, in a case where the calculated trajectory of the acceleration information is not attributed to the electronic device (NO in S111) or after step S110 or after step S112, the process returns to step S101. In the case where the calculated trajectory of the acceleration information is not attributed to the electronic device (NO in S111), an error may be notified to the electronic device instead of returning to step S101.

Controller 22 has a memory in which programs for carrying out the operations of steps S101 to S112 and executes the programs to perform these control functions.

The determination on whether the calculated trajectory of the acceleration information is attributed to the seatback or attributed to the electronic device may be performed in an information processing apparatus which will be described later. Also, the destination to which the inclination angle of the seatback or the electronic device is sent may be the later-described information processing apparatus.

Also, although the determination on whether the trajectory of the acceleration information is attributed to the seatback is performed before the determination on whether the trajectory of the acceleration information is attributed to the electronic device, this is merely an example, and the order of these determination steps may be reversed. That is, the determination on whether the trajectory of the acceleration information is attributed to the electronic device may be performed before the determination on whether the trajectory of the acceleration information is attributed to the seatback.

1-3. Advantageous Effects and so on

An electronic device in an aspect of the present disclosure is an electronic device which is mounted on a seat that is turnable around a first axis such that the electronic device is turnable around a second axis. This electronic device comprises: a detector that continuously detects acceleration information; and a controller that determines which of a turn around the first axis and a turn around the second axis is occurring based on a temporal change in the acceleration information detected by the detector.

An electronic device in another aspect of the present disclosure is an electronic device which is mounted on a reclining seat such that the electronic device is inclinable. This electronic device comprises: a detector that continuously detects acceleration information; and a controller that determines which of an inclination of the seat and an inclination of the electronic device is occurring based on a temporal change in the acceleration information detected by the detector.

Specifically, the acceleration sensor, which is the detector, acquires the acceleration information continuously with time. Accordingly, the controller can calculate the acceleration information as a trajectory as shown in FIG. 2.

Also, since the trajectory of the acceleration information is expressed as an upward-projected curve in a case where seatback 11 is turned around first axis 3 as shown in FIG. 2, the controller can determine that the trajectory of the acceleration information is attributed to a turn around first axis 3.

Further, since the trajectory of the acceleration information is expressed as a downward-projected curve in a case where electronic device 2 is turned around second axis 4 as shown in FIG. 2, the controller can determine that the trajectory of the acceleration information is attributed to a turn around second axis 4.

Accordingly, the controller can determine which of the turn around the first axis or the turn around the second axis is occurring.

Consequently, even if the electronic device is mounted on the seatback which is turnable around the first axis such that the electronic device is turnable around the second axis provided on the seatback, it is possible by the electronic device in accordance with the present exemplary embodiment to identify whether the seat is in a reclined position or the electronic device is turned.

Application Example of the Exemplary Embodiment

Hereinafter, an application example of the present exemplary embodiment (an application example, hereafter) will be described with reference to FIGS. 4 to 7.

2-1. Configuration

Figure 4:
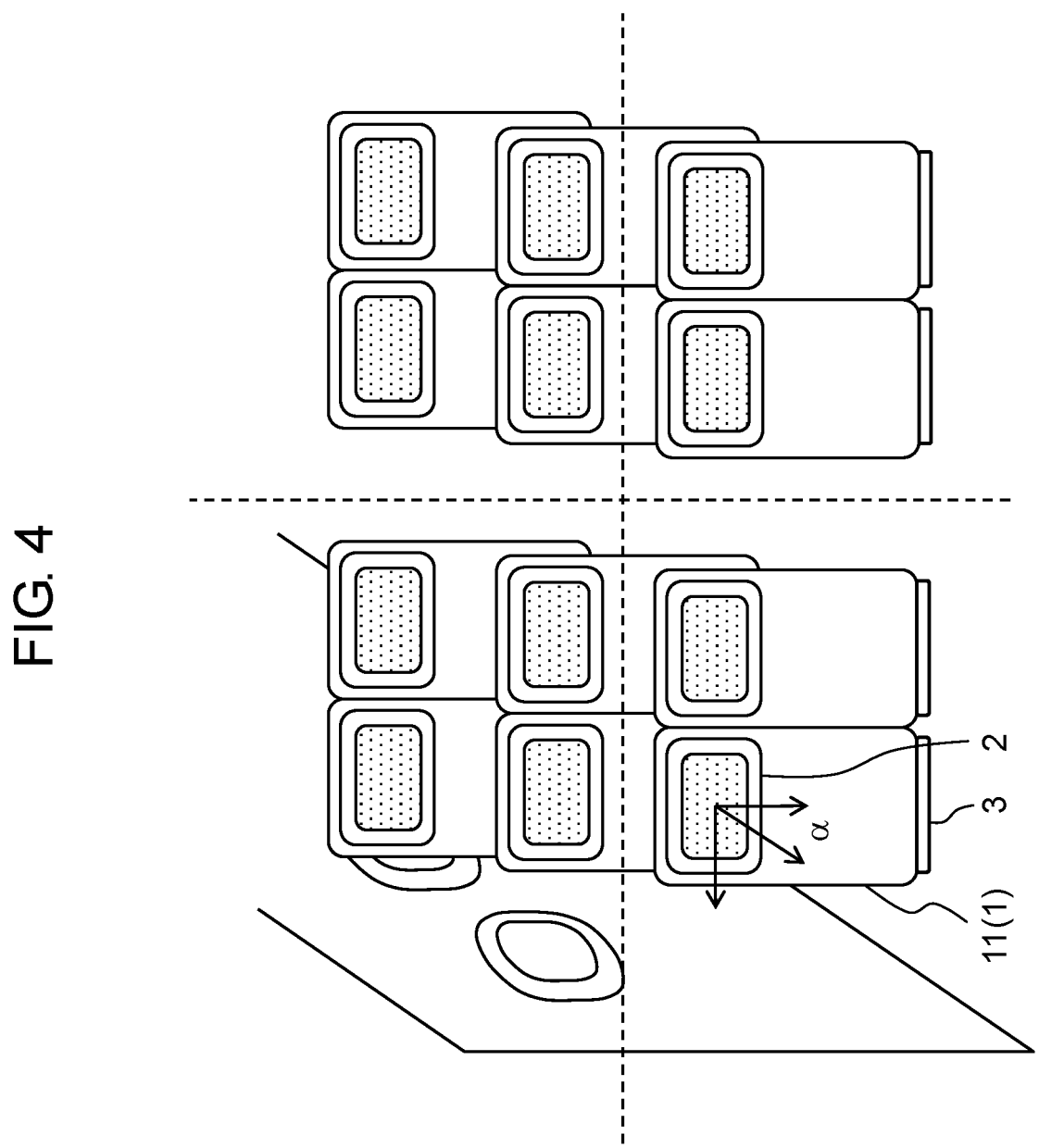
FIG. 4 is a schematic view illustrating an application example in accordance with the present exemplary embodiment.

FIG. 4 is a schematic view illustrating an application example.

As shown in FIG. 4, a plurality of seats 1 in accordance with the present exemplary embodiment are arranged in a vehicle. Also, electronic device 2 in accordance with the present exemplary embodiment is mounted on seatback 11 of each of seats 1. The vehicle here may, for example, be an airplane, a helicopter, a space shuttle, or the like.

Also, as shown in FIG. 4, an acceleration sensor provided in each electronic device 2 acquires acceleration information as a 3-dimensional value (α, for example).

Each of the electronic devices is connected to a later-described information processing apparatus and can transmit information to and receive information from the information processing apparatus. An example of the information processing apparatus may be a server or the like. Therefore, the information processing apparatus can obtain the acceleration information from the electronic devices.

Connection between each of the electronic devices and the information processing apparatus may be a wired connection such, for example, as Ethernet or a wireless connection such, for example, as Wi-Fi.

Figure 5:
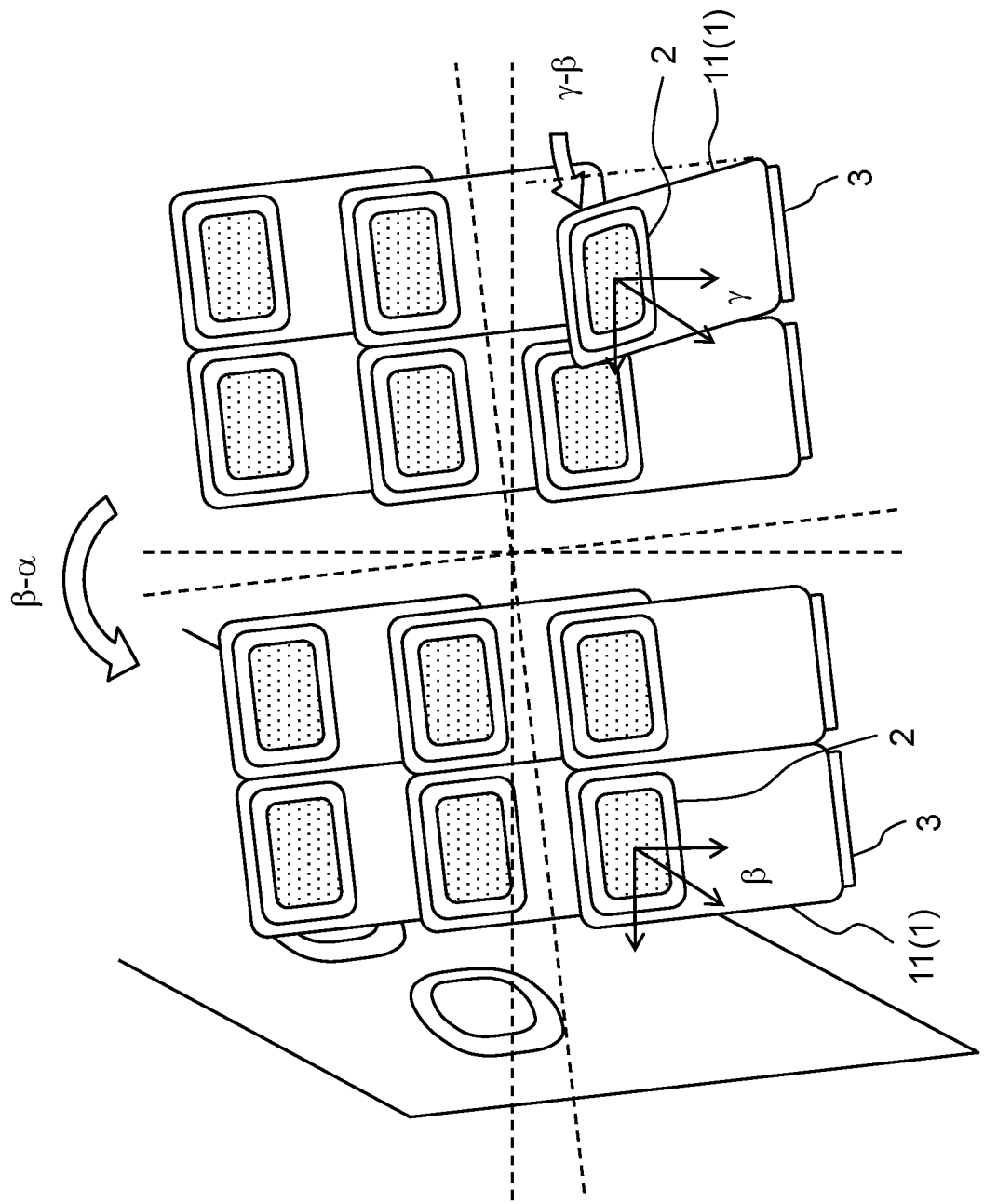
FIG. 5 is a schematic view illustrating an example of a state after a certain period of time has passed from the state of FIG. 4.

FIG. 5 is a schematic view illustrating an example of a state after a certain period of time has passed from the state of FIG. 4.

As shown in FIG. 5, the vehicle after a certain period of time has passed from the state shown in FIG. 4 may be inclined due to, for example, a motion such as a turning motion.

Accordingly, the acceleration sensor of electronic device 2 acquires a value of the acceleration information which is different from value α (β, for example). In this case, it is possible to obtain an amount of change (a difference) β−α, which is an amount of change from value α of the acceleration information of electronic device 2 in the state shown in FIG. 4 to value β of the acceleration information of electronic device 2 in the state after a certain period of time has passed from the state shown in FIG. 4.

Also, in a case where seat 1 is in a reclined position as shown in FIG. 5 (the rear right seat 1 shown in FIG. 5), the acceleration sensor of electronic device 2 on the reclined seat 1 acquires another value of the acceleration information which is different from value β of the acceleration information (γ, for example). Accordingly, it is possible to obtain a difference γ−β between value β of the acceleration information on a non-reclined seat 1 and value γ of the acceleration information on the reclined seat 1 in FIG. 5.

In the application example, as described above, the information processing apparatus can determine an amount of temporal change of the acceleration information and a difference of values of the acceleration information between a seat and another seat to identify a reclined seat. In a case where the vehicle is an airplane, for example, electronic device 2 detects value α of the acceleration information before take-off, when almost no inclination of the fuselage is caused, as shown in FIG. 4. In a stage where the airplane is shifting to a landing phase after flight for a certain period of time, the fuselage is inclined and most of the seats have been returned to their non-reclined positions, while such a case may likely occur that some of the seats remain in the reclined positions. In this case, electronic devices 2 on most of the seats detect value β of the acceleration information, and electronic devices 2 on the seats remaining in the reclined positions detect value γ of the acceleration information. The information processing apparatus can identify the inclination of the airplane from the difference between value α and value β of the acceleration information, and also can identify the reclined seats from the difference between value β and value γ of the acceleration information.

Figure 6:
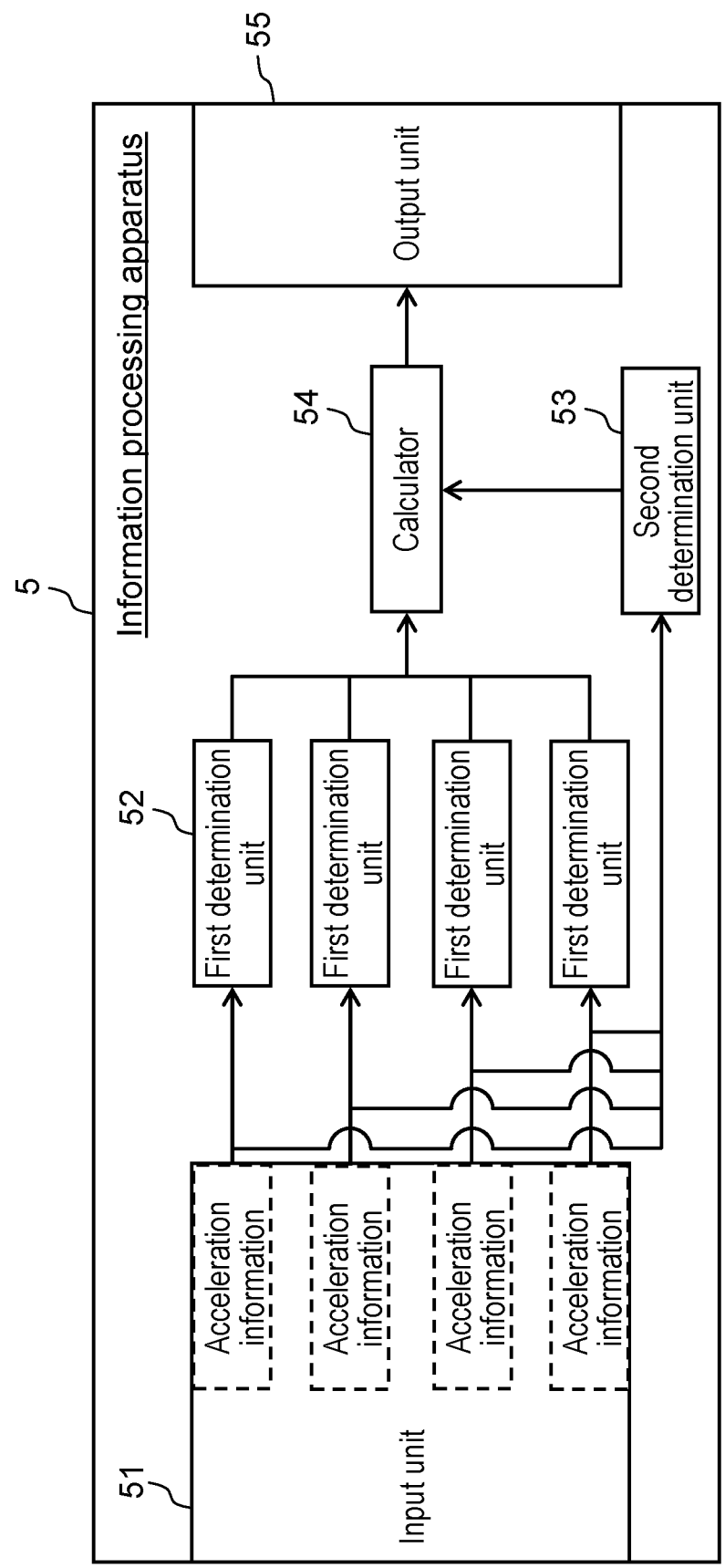
FIG. 6 is a block diagram illustrating a configuration example of an information processing apparatus.

FIG. 6 is a block diagram illustrating a configuration example of the information processing apparatus.

Information processing apparatus 5 comprises input unit 51, first determination unit 52, second determination unit 53, calculator 54, and output unit 55.

Input unit 51 acquires information from each of the devices connected to information processing apparatus 5. In the application example, information processing unit 5 is connected to electronic devices 2, and input unit 51 acquires acceleration information.

First determination unit 52 determines whether the seatback is turned around first axis 3 or electronic device 2 is turned around second axis 4 based on the trajectory of the acceleration information from a corresponding one of acceleration sensors 21, as described in the present exemplary embodiment. The determination by the first determination unit is made by continuously capturing the temporal changes in the acceleration information.

Second determination unit 53 determines an inclination of the vehicle using the acceleration information from acceleration sensors 21 of plural electronic devices 2. Specifically, as shown in FIGS. 4 and 5, second determination unit 53 determines whether or not the vehicle is inclined based on the amount of change of the acceleration information between timings before and after a lapse of a certain period of time. The determination by the second determination unit is made by continuously capturing the temporal changes in the acceleration information, in the same manner as the first determination unit.

Calculator 54 calculates an inclination angle of seatback 11 of a reclined seat 1 based on the determination results by both first determination unit 52 and second determination unit 53.

Output unit 55 outputs inclination information based on the inclination angle calculated by calculator 54. The output destination may be electronic device 2 on each of the seats connected to information processing apparatus 5 or, in a case of an airplane, an electronic device for use by a crew. Also, the inclination information may be the inclination angle itself or may be an indication notifying that the inclination angle is caused.

2-2. Operations

Figure 7:
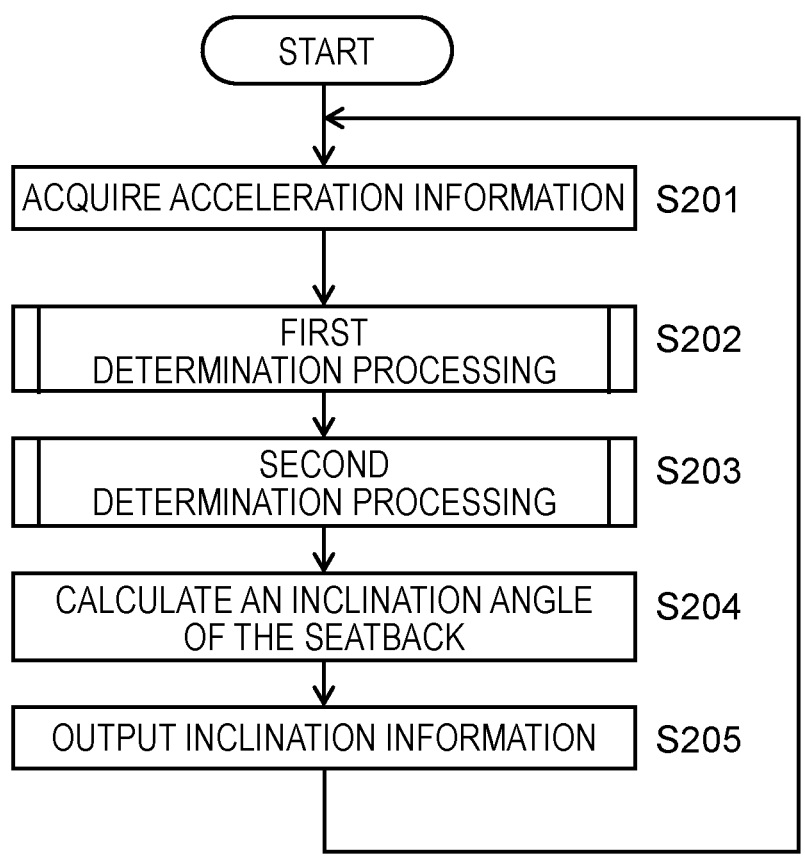
FIG. 7 is a flowchart illustrating an operation example of the information processing apparatus.

FIG. 7 is a flowchart illustrating an operation example of the information processing apparatus.

First, input unit 51 acquires acceleration information from acceleration sensor 21 provided in each of electronic devices 2 (S201). Input unit 51 may begin acquiring the acceleration information, in the same manner as the present exemplary embodiment, when the acceleration sensor has been activated or when the acceleration sensor has received a signal instructing the acceleration sensor to acquire the acceleration information.

Next, first determination unit 52 determines whether seatback 11 is turned around first axis 3 or electronic device 2 is turned around second axis 4 using the trajectory of the acceleration information from a corresponding one of acceleration sensors 21 (S202: the first determination processing). Specifically, in the same manner as the present exemplary embodiment, it is determined that seatback 11 is turned around first axis 3 in a case where the trajectory of the acceleration information is introduced as an upward-projected curve, and that electronic device 2 is turned around second axis 4 in a case where the trajectory of the acceleration information is introduced as a downward-projected curve.

Also, second determination unit 53 determines an inclination of the vehicle using the acceleration information from acceleration sensors 21 in plural electronic devices 2 (S203: the second determination processing). Specifically, referring to FIGS. 4 and 5, value α of the acceleration information can be obtained, for example, and thereafter, when the vehicle is inclined, value β of the acceleration information different from value α can be obtained. Accordingly, it is possible to determine whether or not the vehicle is inclined based on the value of β−α, or the amount of change.

Then, based on the determination result by the first determination unit in step S202 and the determination result by the second determination unit in step S203, calculator 54 calculates an inclination angle of seatback 11 of seat 1 on which electronic device 2 is mounted (S204). Specifically, as shown in FIG. 5, in a case where seat 1 is reclined (the rear right seat 1 shown in FIG. 5) and the vehicle is inclined, value γ which is different from value β can be acquired by the acceleration sensor. Accordingly, it is determined whether or not a seatback is turned around the first axis using the trajectory of the acceleration information by the first determination unit, and an inclination of the vehicle is determined from the amount of change in the acceleration information by the second determination unit. Then, an inclination angle of a reclined seatback is calculated using the difference of values (γ−β) of the acceleration information between the reclined seat and another seat different from the reclined seat.

Output unit 55 outputs inclination information based on the calculated inclination angle (S205). For example, in a case of outputting the inclination information to display unit 23 of electronic device 2, an indication notifying that the seat is reclined is output as the inclination information to the display unit of the electronic device disposed in front of the reclined seat, or of the electronic device mounted on the backside of the seatback of the seat in front of the reclined seat. As another example, the inclination information may be output to an electronic device used by a crew to indicate the reclined seat.

After outputting the inclination information, the operation process returns to step S201 again.

It has been described as the above that the second determination unit determines the inclination of the vehicle using values α and β of the acceleration information of the non-reclined seat in the second determination processing in step S203, and the calculator calculates the inclination angle of the seatback of the reclined seat using value β of the acceleration information of the non-reclined seat and value γ of the acceleration information of the reclined seat. However, the determination of the inclination of the vehicle and the determination whether or not the seat is reclined may be performed by calculating average values of the acceleration information obtained by the acceleration sensors of a plurality of electronic devices, and then calculating a difference between each value of the acceleration information from the average value.

Specifically, second determination unit 53 of information processing apparatus 5 calculates average value βa of the acceleration information obtained by a plurality of acceleration sensors. Then, second determination unit 53 determines the inclination of the vehicle from a difference (α−βa) between value α of the acceleration information and the calculated average value βa, in place of value β of the acceleration information described with reference to FIG. 5. Then, calculator 54 compares value γ of each acceleration information to average value βa to determine whether or not a seat is reclined. Specifically, since value γ of the acceleration information detected by the acceleration sensor mounted on a reclined seat is large in difference from average value βa, it is possible to identify the reclined seat. In this case, the inclination angle of the reclined seat may also be calculated in the same manner as step S204 in FIG. 7.

Further, although first determination unit 52 of information processing apparatus 5 determines whether seatback 11 is turned around first axis 3 or electronic device 2 is turned around second axis 4 in the above-described application example, controller 22 provided in electronic device 2 may perform such determination in the same manner as in the exemplary embodiment.

Further, although it has been described in the above application example that the second determination processing is made by the second determination unit after the first determination processing is made by the first determination unit, this order of determination processing is merely an example, and the order of determination processing may be reversed. That is, the first determination processing may be performed after the second determination processing.

2-3. Advantageous Effect and so on

An information processing apparatus in accordance with the present disclosure is an information processing apparatus that is connected to a plurality of electronic devices which are respectively mounted on a plurality of reclining seats arranged in a vehicle and which are capable of detecting acceleration information. Each of the seat is turnable around a first axis, and each of the electronic devices is mounted on a backside of a respective seat so as to be turnable around a second axis. The information processing apparatus comprises: an input unit that receives acceleration information detected by each of the plurality of electronic devices; a first determination unit that determines a turned state of the first axis and a turned state of the second axis based on a temporal change in acceleration information received from a first electronic device among the plurality of electronic devices; a second determination unit that determines an inclination state of the vehicle based on acceleration information detected by the plurality of electronic devices; a calculator that calculates an inclination angle of a seat on which the first electronic device is mounted based on the turned states determined by the first determination unit and the inclination state of the vehicle determined by the second determination unit; and an output unit that outputs a calculation result of the calculator.

This allows a reclined seat to be recognized by the acceleration sensors provided in the electronic device even if the vehicle is in an inclined state.

Also, the information processing apparatus in accordance with the present disclosure may output inclination information of a reclined seat, for example, from the output unit to an electronic device for a passenger disposed on a seat in front of the inclined seat.

This makes it possible, in a case where a seat is reclined, for example, to display an indication that the seat is reclined on a display unit of an electronic device in front of the seat, or an electronic device mounted on a seat in front of the reclined seat, so that the passenger can recognizes that the seatback of his/her seat is reclined.

Also, the information processing apparatus in accordance with the present disclosure may output the inclination information of a reclined seat from the output unit to an electronic device which is prepared for a crew. This allows the crew to recognize the reclined seat.

Other Exemplary Embodiments

In the above description, the exemplary embodiment has been described as an example of techniques disclosed in the present application. For this purpose, the accompanying drawings and the detailed description have been provided.

Accordingly, the components shown in the drawings and described in the detailed description may include not only components that are essential to solve the problems, but also components that are for exemplifying the above-described techniques and thus are not essential to solve the problems. Therefore, it should not be immediately recognized that such non-essential components are essential merely because they are shown in the drawings or described in the detailed description.

Also, since the above-described exemplary embodiment is for exemplifying the techniques according to the present disclosure, various modifications, substitutions, additions or omissions may be made within the scope of the claims and equivalents thereof.

Although it is determined, in the above-described exemplary embodiment, which of the turn around the first axis and the turn around the second axis is occurring according to whether the trajectory of the calculated acceleration information is projected upward or is projected downward, the determination method may not be limited to this method. The position of the turning axis may be determined by calculating a radius of curvature from the arcuate curve drawn by the trajectory of the calculated acceleration information. In this method, even when the turn of the electronic device around the second axis draws an upward-projected trajectory, for example, it is possible to distinguish the turn around the first axis and the turn around the second axis from each other.

Although such a case has been described in the above exemplary embodiment that the inclination information containing the inclination angle of the seatback of the seat is displayed on the electronic device for the passenger and the electronic device for the crew, the inclination information of the electronic device for the passenger may be displayed.

INDUSTRIAL APPLICABILITY

The present disclosure is useful for electronic devices which are respectively mounted on reclining passenger seats for a vehicle such, for example, as an airplane, and which is turnable. Also, the present disclosure is useful for an information processing apparatus that is connected to the electronic devices.

What is claimed is:

1. An information processing apparatus configured to be connected to a plurality of electronic devices, the plurality of electronic devices being configured to detect accelerations, the plurality of electronic devices being respectively mounted on a plurality of seats that are arranged in a vehicle, each of the plurality of seats being configured to be reclined around a first axis, the information processing apparatus comprising:
   an input unit configured to receive the accelerations detected by the plurality of electronic devices respectively mounted on the plurality of seats;
   a determination unit configured to determine an inclination of the vehicle based on the accelerations detected by the plurality of electronic devices; and
   a calculator configured to identify a seat, from among the plurality of seats, that is reclined around the first axis based on both of (i) the accelerations detected by the plurality of electronic devices and (ii) the determined inclination of the vehicle.

2. The information processing apparatus according to claim 1, wherein the determination unit is configured to determine the inclination of the vehicle based on an average value of the accelerations detected by the plurality of electronic devices.

3. The information processing apparatus according to claim 2, wherein the calculator is configured to identify the seat based on a difference between (i) each of the accelerations detected by the plurality of electronic devices and (ii) the average value of the accelerations detected by the plurality of electronic devices.

4. The information processing apparatus according to claim 1, further comprising an output unit configured to output information indicating that the identified seat is reclined to an electronic device mounted on a seat in front of the identified seat.

5. The information processing apparatus according to claim 1, further comprising an output unit configured to output information indicating that the identified seat is reclined to an electronic device prepared for a crew, the electronic device prepared for the crew being separate from the plurality of electronic devices.

6. The information processing apparatus according to claim 1, wherein:
   the plurality of electronic devices include a first electronic device that is mounted on a corresponding first seat from among the plurality of seats, the first electronic device being configured to be turned around a second axis relative to the corresponding first seat, and
   the first electronic device includes:
      an acceleration sensor configured to detect an acceleration; and
      a controller configured to determine whether the corresponding first seat is reclined around the first axis or the first electronic device is turned around the second axis based on a trajectory of the acceleration.

7. The information processing apparatus according to claim 6, wherein the controller is configured to:
   determine whether the trajectory of the acceleration is an upward-projected curve or a downward-projected curve,
   determine that the corresponding first seat is reclined around the first axis, when the controller determines that the trajectory of the acceleration is the upward-projected curve, and
   determine that the first electronic device is turned around the second axis, when the controller determines that the trajectory of the acceleration is the downward-projected curve.

* * * * *